US009766494B2

(12) United States Patent
Gu

(10) Patent No.: US 9,766,494 B2
(45) Date of Patent: Sep. 19, 2017

(54) DOUBLE-FACED DISPLAY PANEL AND MANUFACTURING METHOD THEREOF

(71) Applicant: BOE TECHNOLOGY GROUP CO., LTD., Beijing (CN)

(72) Inventor: Xin Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 585 days.

(21) Appl. No.: 14/356,021

(22) PCT Filed: Dec. 10, 2013

(86) PCT No.: PCT/CN2013/088984
§ 371 (c)(1),
(2) Date: May 2, 2014

(87) PCT Pub. No.: WO2014/190719
PCT Pub. Date: Dec. 4, 2014

(65) Prior Publication Data
US 2016/0274412 A1   Sep. 22, 2016

(30) Foreign Application Priority Data

May 31, 2013   (CN) .......................... 2013 1 0215618

(51) Int. Cl.
G02F 1/1333 (2006.01)
G02F 1/1335 (2006.01)
(Continued)

(52) U.S. Cl.
CPC ...... *G02F 1/133555* (2013.01); *G02F 1/1334* (2013.01); *G02F 1/1362* (2013.01);
(Continued)

(58) Field of Classification Search
CPC ................. G02F 1/1334; G02F 1/1335; G02F 1/133555; G02F 1/133512;
(Continued)

(56) References Cited

U.S. PATENT DOCUMENTS

2003/0063243 A1   4/2003   Roosendaal et al.
2008/0036953 A1   2/2008   Otake
(Continued)

FOREIGN PATENT DOCUMENTS

CN   1559022 A   12/2004
CN   1690785 A   11/2005
(Continued)

OTHER PUBLICATIONS

International Search Report mailed Feb. 27, 2014; PCT/CN2013/088984.
(Continued)

*Primary Examiner* — Thoi Duong
(74) *Attorney, Agent, or Firm* — Ladas & Parry LLP

(57) ABSTRACT

Embodiments of the present invention disclose a double-faced display panel and a manufacturing method thereof, the double-faced display panel includes: an array substrate, including a first transparent substrate, a first trans-reflective layer formed on the first transparent substrate and a first electrode layer formed on the first trans-reflective layer; an opposed substrate, disposed to face the array substrate, and including a second transparent substrate, a second trans-reflective layer formed on a side of the second transparent substrate facing the first transparent substrate and a second electrode layer formed on a side of the second transparent substrate facing the first transparent substrate; a display structure, disposed between the array substrate and the opposed substrate and including a plurality groups of display units arranged in matrix, wherein each of the first and second
(Continued)

trans-reflective layers includes a plurality of reflection regions and a plurality of transmission regions disposed alternately.

20 Claims, 5 Drawing Sheets

(51) Int. Cl.
*G02F 1/1334* (2006.01)
*G02F 1/1343* (2006.01)
*G02F 1/1362* (2006.01)

(52) U.S. Cl.
CPC .... *G02F 1/13439* (2013.01); *G02F 1/133514* (2013.01); *G02F 1/133528* (2013.01); *G02F 1/134309* (2013.01); *G02F 2001/133342* (2013.01); *G02F 2001/133531* (2013.01)

(58) Field of Classification Search
CPC ......... G02F 1/133553; G02F 1/134336; G02F 1/167; G02F 1/133514; G02F 1/133536; G02F 1/133615; G02F 1/15; G02F 1/155; G02F 1/13; G02F 1/1333; G02F 2203/09; G02F 2001/133616; G02F 2001/136222; H01L 27/322; H01L 27/3206; H01L 27/3211; H01L 27/3267; H01L 51/5016; H01L 51/5234; H01L 51/504; H01L 2251/5376; C09K 9/00

USPC ..... 349/113, 114, 106, 1, 110, 139, 187, 86, 349/65
See application file for complete search history.

(56) References Cited

U.S. PATENT DOCUMENTS

| | | | |
|---|---|---|---|
| 2009/0066896 A1* | 3/2009 | Kawashima | G02F 1/133371 349/114 |
| 2009/0219474 A1* | 9/2009 | Chu | G02F 1/1334 349/114 |
| 2010/0026941 A1* | 2/2010 | Umeno | G02F 1/133555 349/114 |

FOREIGN PATENT DOCUMENTS

| | | |
|---|---|---|
| CN | 102914899 A | 2/2013 |
| CN | 103293793 A | 9/2013 |
| JP | 2004-145109 A | 5/2004 |
| KR | 20090036257 A | 4/2009 |

OTHER PUBLICATIONS

Written Opinion of the International Searching Authority Appln. No. PCT/CN2013/088984; Dated Jan. 27, 2014.
Second Chinese Office Action Appln. No. 201310215618.5; Dated Aug. 14, 2015.
First Chinese Office Action Appln. No. 201310215618.5; Dated Apr. 3, 2015.

* cited by examiner

DOUBLE-FACED DISPLAY PANEL AND MANUFACTURING METHOD THEREOF

TECHNICAL FIELD

Embodiments of the present invention relate to a double-faced display panel and a manufacturing method thereof.

BACKGROUND

At present, a double-faced display device that can display an image on both sides of the display is often needed. The double-faced display device may be applied in communication industry, government windows, financial industry, transportation industry, and a business hall in window industries, such as public places with large population such as air ports, railway stations, subway stations, dining rooms, and therefore the double-faced display device has a broad developing potential.

In prior art, a typical structure of a double-faced display device is as shown in FIG. 1, comprising: a liquid crystal layer 40, a first polarizer 41 and a second polarizer 42 on both sides of the liquid crystal layer 40, a front light source system 43 close to a first polarizer side, and a reflective polarizer 44 between the second polarizer 42 and the liquid crystal layer 40. It is to be noted that when an incidence direction of light is consistent with a polarization direction of the reflective polarizer 44, the light may transmit through the reflective polarizer 44, and when the incidence direction is not consistent with the polarization direction, the light is reflected back by the reflective polarizer 44. With such a double-faced display device having this structure, when electric fields on both sides of the liquid crystal layer 10 change, liquid crystal molecules in the liquid crystal layers 40 may be in horizontal and vertical states respectively. When the liquid crystal molecules are in the horizontal state, one face of the display may display an image in a transmission mode; and when the liquid crystal molecules are in the vertical state, the other face of the display may display an image in a reflection mode by the reflective polarizer 44. However, this kind of double-faced liquid crystal display device can not work in these two modes at the same time and thereby can not realize a function of displaying images on both faces at the same time.

SUMMARY

Embodiments of the present invention provide a double-faced display panel and a manufacturing method thereof which can realize simultaneous display on two faces.

In one aspect, an embodiment of the present invention provides a double-faced display panel, the double-faced display panel comprises: an array substrate, comprising a first transparent substrate, a first trans-reflective layer formed on the first transparent substrate and a first electrode layer formed on the first trans-reflective layer; an opposed substrate, disposed to face the array substrate, and comprising a second transparent substrate, a second trans-reflective layer formed on a side of the second transparent substrate facing the first transparent substrate and a second electrode layer formed on a side of the second transparent substrate facing the first transparent substrate; a display structure, disposed between the array substrate and the opposed substrate and comprising a plurality groups of display units arranged in matrix, wherein each of the first and second trans-reflective layers comprises a plurality of reflection regions and a plurality of transmission regions disposed alternately.

In another aspect, an embodiment of the present invention provides a manufacturing method of a double-faced display panel comprising an array substrate, an opposed substrate and a display structure disposed between the array substrate and the opposed substrate and having a plurality groups of display units arranged in matrix, wherein a step for manufacturing the array substrate comprises: forming a pattern of reflection regions spaced away from each other on a surface of a first transparent substrate, forming a pattern of transmission regions adjacent to the reflection regions on the surface of the first transparent substrate on which the pattern of the reflection regions is formed so as to form a first trans-reflective layer and forming a first electrode layer on a surface of the first trans-reflective layer; and a step for manufacturing the opposed substrate comprises: forming a pattern of reflection regions spaced away from each other on a surface of a second transparent substrate, forming a pattern of transmission regions adjacent to the reflection regions on the surface of the second transparent substrate on which the pattern of the reflection regions is formed so as to form a second trans-reflective layer, forming a second electrode layer on a surface of the second trans-reflective layer.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
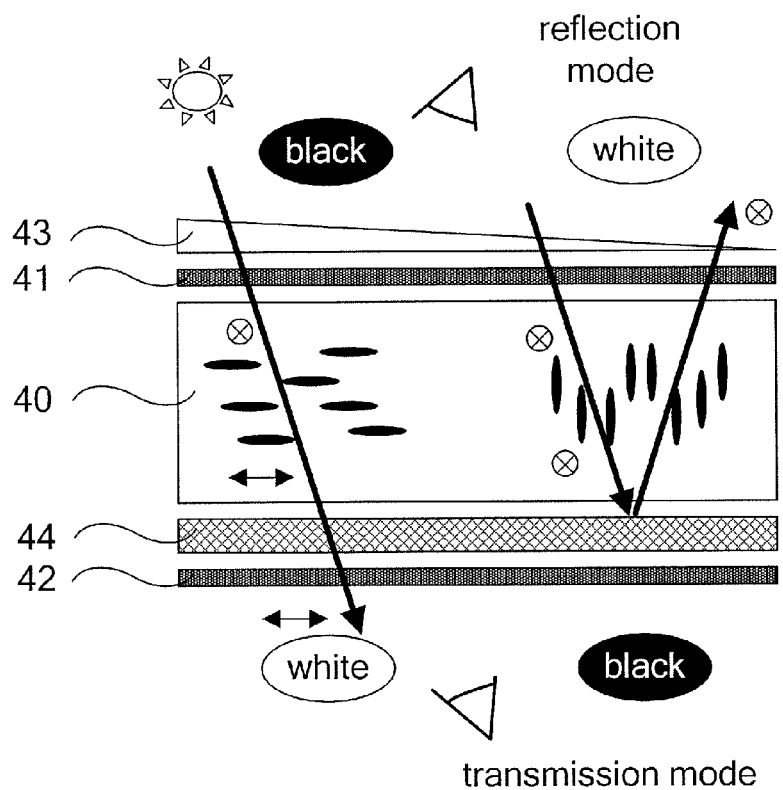
FIG. 1 is a structural schematic view of a conventional double-faced display device.
Figure 2:
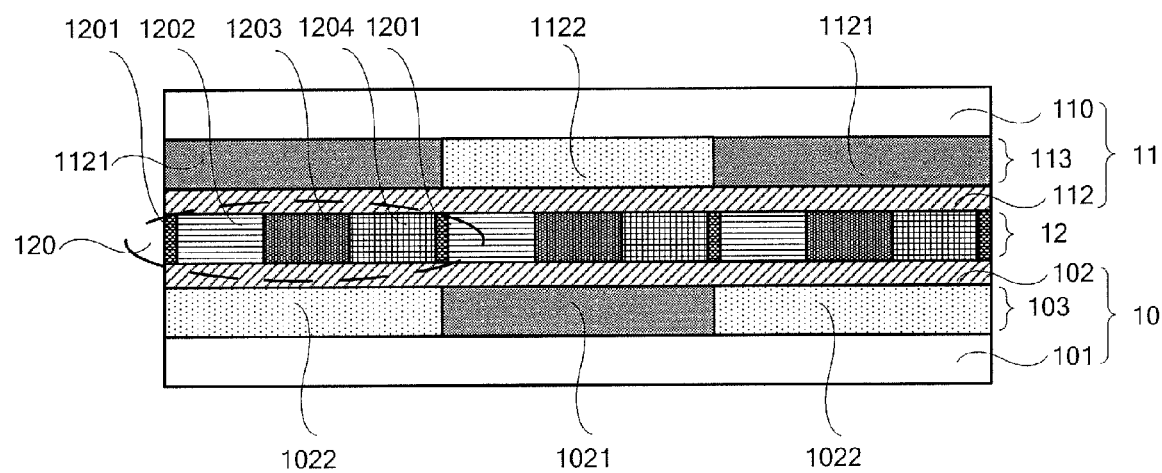
FIG. 2 is a structural schematic view of a double-faced display panel according to an embodiment of the present invention.

As shown in FIG. 2, a double-faced display panel provided in an embodiment of the present invention comprises an array substrate 10 and an opposed substrate 11 with a display structure 12 therebetween having a plurality groups of display units 120 arranged in matrix, wherein the array substrate 10 comprises a first transparent substrate 101, a first trans-reflective layer 103 formed on the first transparent substrate 101, and a first electrode layer 102 formed on the first trans-reflective layer; the opposed substrate 11 faces the array substrate 10 and comprises a second transparent substrate 110, a second trans-reflective layer 113 formed on a side of the second transparent substrate 110 facing the first transparent substrate 101 and a second electrode layer 112.

The trans-reflective layer (the first trans-reflective layer 103 or the second trans-reflective layer 113) comprises reflection regions (reflection regions 1021 of the first trans-reflective layer 103 or reflection regions 1121 of the second trans-reflective layer 113) and transmission regions (transmission regions 1022 of the first trans-reflective layer 103 or transmission regions 1122 of the second trans-reflective layer 113) disposed alternately.

A double-faced display panel provided in an embodiment of the present invention comprises an array substrate and an opposed substrate with a display structure therebetween having a plurality groups of display units arranged in matrix. A trans-reflective layer is disposed in the display panel, wherein the trans-reflective layer comprises reflection regions and transmission regions disposed alternately and each of the reflection regions and transmission regions corresponding to one group or a plurality groups of display units. In this way, it is possible to enable both faces of the display device to perform the displaying by using the transmission regions, thereby realizing simultaneous display of both faces of the display device.

Exemplarily, in the double-faced display panel provided in the embodiments of the present invention, the reflection regions of the first trans-reflective layer and the transmission regions of the second trans-reflective layer correspond to each other in a one-to-one correspondence relationship, the transmission regions of the first trans-reflective layer and the reflection regions of the second trans-reflective layer correspond to each other in a one-to-one correspondence relationship.

It is noted that each of the reflection regions and the transmission regions corresponding to one set or a plurality sets of display units 120 means that a width of the reflection region of the trans-reflective layer or the transmission region of the trans-reflective layer at least equal to a width of one group or a plurality groups of display units 120.

Exemplarily, the group number of the display units 120 corresponding to the reflection region of the trans-reflective layer or the transmission region of the trans-reflective layer may be an integer, for example, the reflection region 1021 of the first trans-reflective layer 103 and the transmission region 1022 of the first trans-reflective layer 103 correspond to one, two or three groups of display units 120. The fewer the group number of the display units 120 corresponding to the reflection region of the trans-reflective layer or the transmission region of the trans-reflective layer is, the higher the resolution of a respective display device is, which is advantageous for improving the display effect of the display device. In the display device as shown in FIG. 2, one group of display units 120 may comprise a red display unit 1202, a green display unit 1203 and a blue display unit 1204 disposed adjacent to each other from left to right, and any two adjacent display units 120 may be separated by a black barrier wall 1201. In the display device shown in FIG. 2, a description is given with an example in which each of the reflection region 1021 of the first trans-reflective layer 103, the reflection region 1121 of the second trans-reflective layer 113, the transmission region 1022 of the first trans-reflective layer 103, the transmission region 1122 of the second trans-reflective layer 113 only corresponds to one set of display units 120. It can be contemplated that the beneficial effects obtained when each of the reflection regions of the trans-reflective layer or each of the transmission regions of the trans-reflective layer corresponds to more groups of display units 120 are the same.

Furthermore, the reflection region 1121 of the second trans-reflective layer 113 corresponds to the transmission region 1022 of the first trans-reflective layer 103; and the transmission region 1122 of the second trans-reflective layer 113 corresponds to the reflection region 1121 of the first trans-reflective layer 103.

It is noted that the reflection region 1121 of the second trans-reflective layer 113 corresponding to the transmission region 1022 of the first trans-reflective layer 103 means that the reflection region 1121 of the second trans-reflective layer 113 corresponds to the transmission region 1022 of the first trans-reflective layer 103 in terms of up and down positions, and a width of the reflection region 1121 of the second trans-reflective layer 113 is equal to that of at least one group of display units 120. As described above, the transmission region 1122 of the second trans-reflective layer 113 corresponding to the reflection region 1121 of the first trans-reflective layer 103 is in the same way. With such a corresponding structure, light reflected by the reflection region 1021 of the first trans-reflective layer 103 may be transmitted through the transmission region 1122 of the second trans-reflective layer 113 corresponding to the reflection region 1021. At the same time, light transmitted through the transmission region 1022 of the first trans-reflective layer 103 may be reflected back by the reflection region 1121 of the second trans-reflective layer 113 corresponding to the transmission region 1022. In this way, it is possible to confine reflection or transmission scope of light, avoid mutual interference among light, reduce picture ghost and hence improve display effect of the double-faced display.

Exemplarily, the display structure 12 may comprise an electroluminescent layer. Since the electroluminescent layer has a self-luminous feature, and the electroluminescent layer comprises a plurality groups of display units 120 comprising a red display unit 1202, a green display unit 1203 and a blue display unit 1204 disposed adjacent to each other from left to right. Thus, the double-faced display can realize simultaneous displaying of the both faces without any backlight source and an ambient light may also be used for display.

Figure 3:
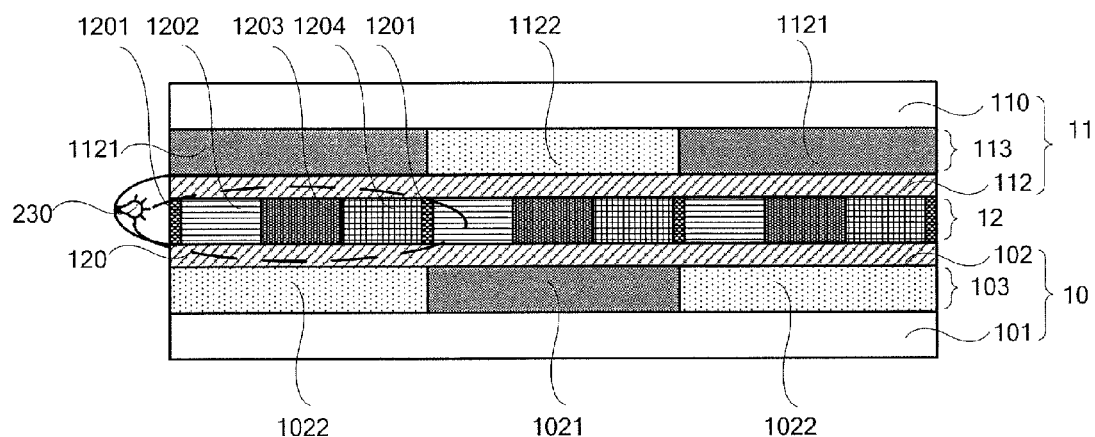
FIG. 3 is a structural schematic view of another double-faced display panel according to an embodiment of the present invention.

Exemplarily, the display structure 12 may comprise an electrochromic layer and a light source. It is noted that the light source may be a natural light or an artificial light source. As shown in FIG. 3, when the light source is an artificial light source 230, the light source 230 is disposed on a side-face of the double-faced display panel and now a light guiding plate, for example, a light guiding plate with high transmittance, needs to be disposed over and/or under the display structure 12. In this way, the double-faced display panel may display on double faces under the action of the light source 230. The electrochromic layer comprises a plurality groups of display units 120. When the electrochromic layer is driven, the display units 120 of the electrochromic layer may generate for example red, green and blue colors. With this kind of display structure, a double-faced display can display an image under natural light conditions, and can also display an image with the backlight source, hence the application scope of the double-faced display can be improved.

Exemplarily, the display structure 12 may comprise a liquid crystal layer. Thus, the double-faced display panel according to an embodiment of the present invention forms a liquid crystal double-faced display panel 20 shown in FIG. 4.

The liquid crystal double-faced display panel 20 comprises a light source 231 and a first liquid crystal layer 21 formed between the array substrate 10 and the opposed substrate 11.

Another side of the array substrate 10 is further provided with a first polarizing film layer 22, and another side of the opposed substrate 11 is further provided with a second polarizing film layer 24.

Figure 4:
FIG. 4 is a structural schematic view of another double-faced display panel according to an embodiment of the present invention.
Figure 4:
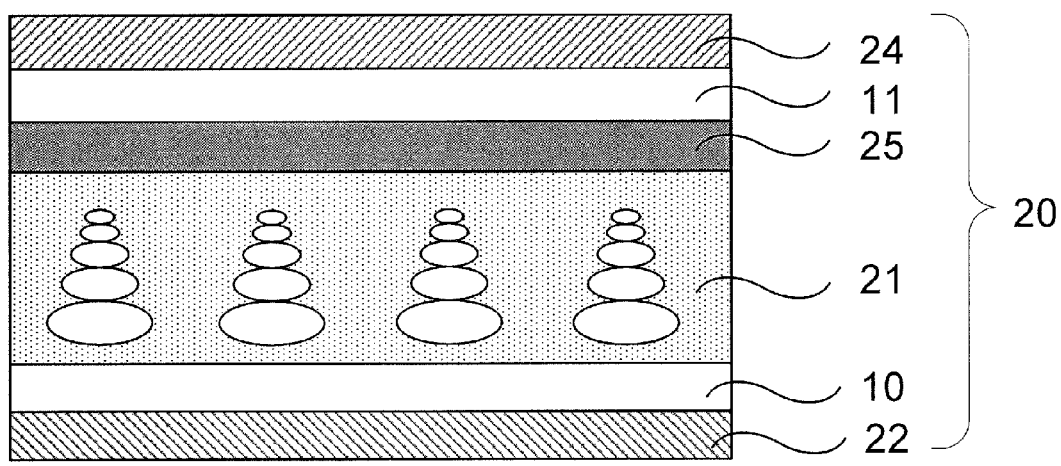

It is noted that as shown in FIG. 4, the light source 231 is a natural light, and the second polarizing film layer 24 is located between the light source and the first liquid crystal layer 21.

When the light source 231 is a manually provided light source, the light source 231 may be disposed on a side-face of the liquid crystal display panel 20 and the liquid crystal double-faced display panel 20 may be further provided with a light guiding plate. Thus, by mounting the light source in a side-edge type mode, the double-faced display having the liquid crystal display panel 20 may realize double-faced display function.

It is noted that in the liquid crystal display panel 20, a color filter layer 25 is disposed between the second polarizing film layer 24 and the first liquid crystal layer 21. In a manufacturing process, it is also possible to form a color filter layer 25 by coating a layer of color filter on a surface of the opposed substrate 11 on a side displaying an image of the liquid crystal double-faced display panel 20, and then attach the second polarizing film layer 24 on another side of the opposed substrate 11 having the color filter layer, so as to reduce layered structures of the liquid crystal display panel 20.

Figure 5:
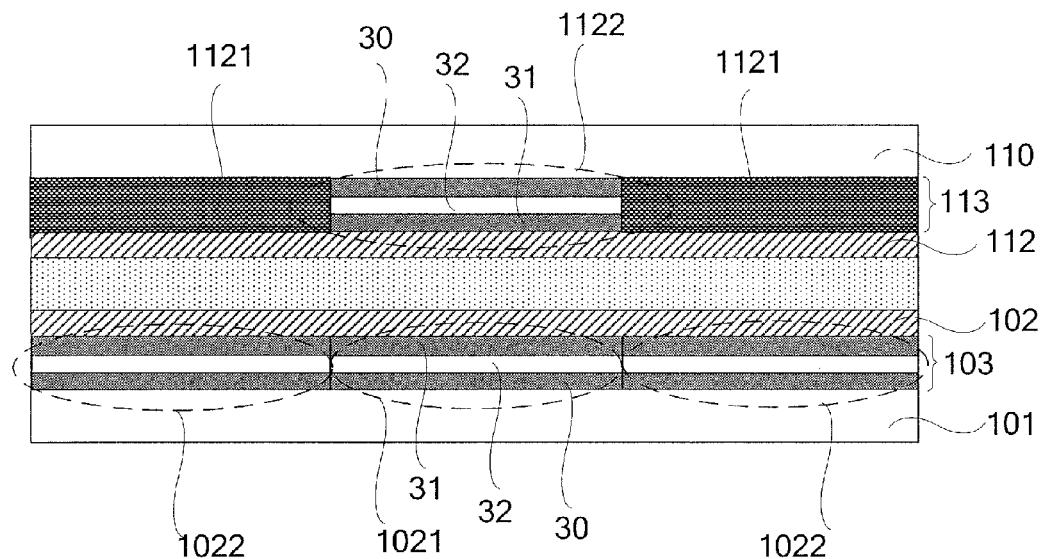
FIG. 5 is a structural schematic view of yet another double-faced display panel according to an embodiment of the present invention.

Exemplarily, as shown in FIG. 5, the reflection region (the reflection region 1021 of the first trans-reflective layer 103 or the reflection region 1121 of the second trans-reflective layer 113) and/or the transmission region (the transmission region 1022 of the first trans-reflective layer 103 or the transmission region 1122 of the second trans-reflective layer 113) comprises:

a first control electrode 30, a second control electrode 31 and a second liquid crystal layer 32 located between the first control electrode 30 and the second control electrode 31, wherein the second liquid crystal layer comprises polymer dispersed liquid crystal.

The first control electrode 30 is located between the second liquid crystal layer 32 and the first transparent substrate 101 or the second transparent substrate 110, the second control electrode 31 is located between the second liquid crystal layer 32 and the first electrode layer 102 or the second electrode layer 112.

Exemplarily, as shown in FIG. 5, such structure of the reflection region or the transmission region may be referred to as a PDLC (Polymer Dispersed Liquid Crystal) structure.

The PDLC structure may have two operation modes, that is, a scattering state and a transparent state. When the first reflecting electrode 30 and the second reflecting electrode 31 are not energized, no regular electric field is formed in the second liquid crystal layer, optical axes of liquid crystal molecules are orientated randomly in a disordered state, incident light is strongly scattered, and the second liquid crystal layer exhibits an opaque or translucent state. When the first reflecting electrode 30 and the second reflecting electrode 31 are energized, the optical axes of the liquid crystal molecules are aligned to be perpendicular to a surface of the second liquid crystal layer, namely, in consistent with the electric field direction, hence constituting a uniform media, and the second liquid crystal layer exhibits transparent state.

The reflection region or the transmission region has the PDLC structure such that when the PDLC structure is not energized, the reflection region or the transmission region operates in the opaque state and light is scattered, wherein a portion of the scattered light may be reflected into a range so that it can be received by the human eyes. When the PDLC structure is energized, the reflection region 1021 or the transmission region 1022 operates in the transparent state and light can transmitted through the reflection region 1021 or the transmission region 1022. In this way, it is possible to control states of the reflection region 1021 and the transmission region 1022 as required to enable the double-faced display to have a plurality of display effects. For example, when both the reflection region 1021 and the transmission region 1022 of the first trans-reflective layer 103 or both the reflection region 1121 and the transmission region 1122 of the second trans-reflective layer 113 operate in the opaque state, the first trans-reflective layer 103 or the second trans-reflective layer 113 has only a reflection function in fact, then if the transmission region corresponding to opaque reflection region has also a transmission function, it is possible to enable one face of the double-faced display to display an image via the transmission region; when both the reflection region 1021 and the transmission region 1022 of the first trans-reflective layer 103 or both the reflection region 1121 and the transmission region 1122 of the second trans-reflective layer 113 operate in the transparent state, the first trans-reflective layer 103 or the second trans-reflective layer 113 has only a transmission function, then if the reflection region corresponding to a transparent transmission region is in the opaque state, it is possible to enable one face of the double-faced display to display an image via the transmission regions; when the reflection region 1021 of the first trans-reflective layer 103 or the reflection region 1121 of the second trans-reflective layer 113 operates in the opaque state, while the transmission region 1022 of the first trans-reflective layer 103 and the transmission region 1122 of the second trans-reflective layer 113 operate in the transparent state, the first trans-reflective layer 103 and the second trans-reflective layer 113 have reflection and transmission functions at the same time, hence allowing both faces of the double-faced display to display via transmission regions. In this way, it is possible to control the PDLC structure to realize simultaneous double-faced display and single-faced display of the display device.

Exemplarily, taking FIG. 5 as an example, the reflection region 1021 and the transmission region 1022 of the first trans-reflective layer 103 and the transmission region 1122 of the second trans-reflective layer 113 adopt the PDLC structure, and the reflection region 1121 of the second trans-reflective layer 113 is made of a metal material, such as aluminum.

A control signal controls the PDLC structure of the reflection region 1021 of the first trans-reflective layer 103 to be in a scattering state, a portion of light reaching the reflection region 1021 of the first trans-reflective layer 103 is reflected, now the PDLC structure of the transmission region 1122 of the second trans-reflective layer 113 corresponding to the reflection region 1021 is controlled to be in a transparent state, then the reflected light by the reflection region 1021 may transmitted through the transmission region 1122 so that a upper face of the double-faced display displays an image. At the same time, the control signal controls the PDLC structure of the transmission region 1022 of the first trans-reflective layer 103 to be in the transparent state, then light can be transmitted through the transmission region 1022, now since the reflection region 1121 of the second trans-reflective layer 113 corresponding to the transmission region 1022 is made of the metal material, such as aluminum, the reflection region 1211 has a reflection function and thereby can reflect the above-mentioned light transmitted through the transmission region 1022. Therefore, it is possible to enable a bottom face of the double-faced display to display an image. In this way, it is possible to realize double-faced display function of the double-faced display device.

In addition, the control signal may further control the PDLC structure of the reflection region 1021 and the transmission region 1022 of the first trans-reflective layer 103 to be in the transparent state and control the PDLC structure of the transmission region 1122 of the second trans-reflective layer 113 to be in the scattering state. In this way, the reflection region 1021 and the transmission region 1022 of the first trans-reflective layer 103 all have the transmission function, while the reflection region 1121 and the transmission region 1122 of the second trans-reflective layer 113 all have the reflection function. Therefore, light reaching the second trans-reflective layer 113 is reflected and can be transmitted through the first trans-reflective layer 103, so as to allow the bottom face of the double-faced display device to display an image while the upper face thereof will not display an image.

In this way, it is possible to switch single-faced and double-faced display functions of the display by changing the control signal. It is noted that the above is only illustrations of the structure of the double-faced display, it is contemplated that when the reflection region 1121 of the second trans-reflective layer 113 also adopts the PDLC structure, or when the reflection region 1021 of the first trans-reflective layer 103 is also made of reflective metal material, the above-mentioned effect may also be generated by changing the control signal, and the embodiments of the present invention do not impose any limitation on this.

Of course, the above description of the controlling method of the reflection region 1021 and the transmission region 1022 of the first trans-reflective layer 103 or the reflection region 1121 and the transmission region 1122 of the second trans-reflective layer 113 is only an exemplary description, other controlling methods for the reflection region and the transmission region will not be described here, but fall within the protection scope of the embodiments of the present invention.

Exemplarily, the reflection region may further comprises a reflective metal layer and materials for manufacturing the reflective metal layer may comprise at least one of aluminum, magnesium, nickel, copper or aluminum oxide or a combination of the above materials. Making the reflective metal layer with this kind of opaque metal material allows light not to be absorbed and transmitted after reaching the reflective metal layer and hence improving the reflectivity of light and the display effect of displaying an image via the reflection region on one face of the double-faced display device.

Exemplarily, when the transmission regions of the trans-reflective layer is of transparent conducting material, the transmission region of the trans-reflective layer and the electrode layer are formed as an integral body.

Figure 6:
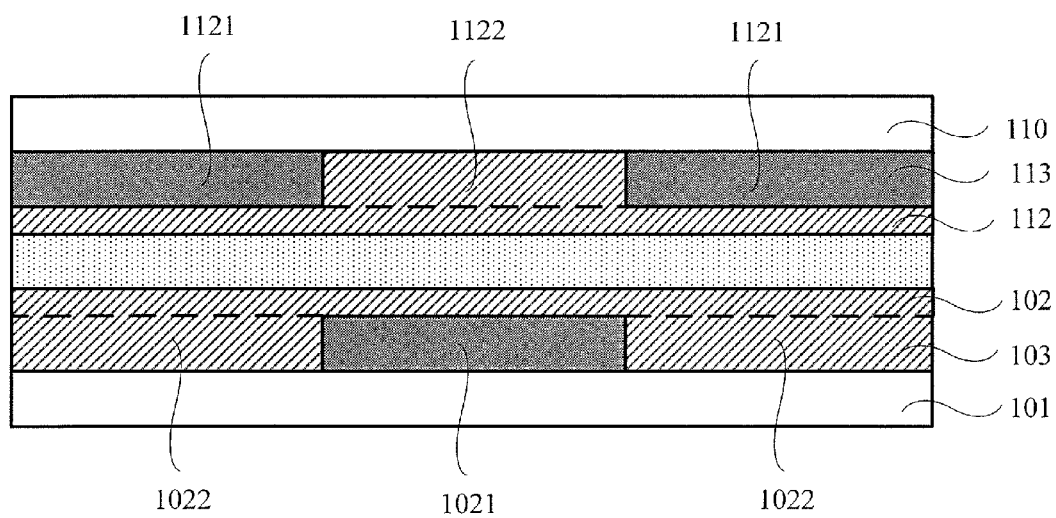
FIG. 6 is a structural schematic view of yet another double-faced display panel according to an embodiment of the present invention.

Exemplarily, as shown in FIG. 6, when the transmission region 1022 of the first trans-reflective layer 103 is of transparent conducting material, the transmission region 1022 of the first trans-reflective layer 103 and the first electrode layer 102 are formed as an integral structure; and/or when the transmission region 1122 of the second trans-reflective layer 113 is of transparent conducting material, the transmission region 1122 of the second trans-reflective layer 113 and the second electrode layer 112 are formed as an integral structure.

It is noted that the transparent conducting material may be ITO (indium tin oxide), indium zinc oxide, etc.

Since the transparent conducting material is transparent and conductive at the same time by itself, with this integral structure, it is possible to realize functions of the transmission region 1022 of the first trans-reflective layer 103 or the transmission region 1122 of the second trans-reflective layer 113 and the first electrode layer 102 or the second electrode layer 112 at the same time, hence resulting in simplified manufacturing process and improved production efficiency.

Furthermore, a thickness of the reflection region or the transmission region may be 50-200 nm, and a width of the reflection region or the transmission region may be determined according to a width of display units 120 corresponding to the reflection region or the transmission regions, wherein a exemplary width of display units 120 is 60~300 μm. Therefore, when the reflection region 1021, the transmission region 1022 of the first trans-reflective layer 103 or the reflection region 1121, the transmission region 1122 of the second trans-reflective layer 113 correspond to one group of display units 120, a width of the reflection region or the transmission region is 60~300 μm. Such design of the reflection region and the transmission region with this size can be easily implemented by a manufacturing process known by the inventor, thereby effectively reducing production difficulty of a product while ensuring the double-faced display effect of the display device.

Exemplarily, with the display panel with such structure provided in the embodiments of the present invention, when inputting identical or different display signals to the display unit 120 corresponding to the reflection region and the display unit 120 corresponding to the transmission region respectively, it is possible to allow two faces of the display device to display the same or different contents. For example, in the display panel shown in FIG. 2, all the display unit 120 corresponding to the reflection region 1021 of the first trans-reflective layer 103 are input with a first signal such that a first image displayed by the display unit 120 corresponding to the reflection region 1021 of the first trans-reflective layer 103 is reflected by the reflection region 1021 of the first trans-reflective layer 103 to be displayed on an upper face of the display device. At the same time, the display unit 120 corresponding to the transmission region 1022 of the first trans-reflective layer 103 is input with a second signal such that a second image displayed by the display unit 120 corresponding to the transmission region 1022 of the first trans-reflective layer 103 is displayed on a bottom face of the display device through transmission. When the first signal is the same as the second signal, the upper and bottom faces of the display device display the same image, and when the first signal is different from the second signal, the upper and bottom faces of the display device display different images. Thus, the display device may display same or different images on two faces, hence greatly improving practicability of the display device.

An embodiment of the present invention provides a manufacturing method of a double-faced display panel, as shown in FIG. 2, comprising an array substrate 10 and an opposed substrate 11, and a display structure 12 between the array substrate 10 and the opposed substrate 11 having a plurality groups of display units 120 arranged in matrix.

Exemplarily, steps of manufacturing the array substrate 10 comprises:

S101. Forming a pattern of reflection regions 1021 disposed with an interval therebetween on a surface of a first transparent substrate 101.

S102. Forming a pattern of transmission regions 1022 adjacent the reflection regions 1021 on the surface of the first transparent substrate 102 on which the pattern of the reflection regions 1021 is formed so as to form a first trans-reflective layer 103.

S103. Forming a first electrode layer 102 on a surface of the first trans-reflective layer 103.

Exemplarily, steps for manufacturing the opposed substrate 11 comprises:

S201. Forming a pattern of reflection regions 1021 disposed with an interval therebetween on a surface of a second transparent substrate 110.

S202. Forming a pattern of transmission regions 1022 adjacent the reflection regions 1021 on the surface of the second transparent substrate 110 on which the pattern of reflection regions 1021 is formed so as to form a second trans-reflective layer 113.

S203. Forming a second electrode layer 112 on a surface of the second trans-reflective layer 113.

A manufacturing method of a double-faced display panel is provided in an embodiment of the present invention, the display panel comprises an array substrate and an opposed substrate with a display structure therebetween having a plurality groups of display units arranged in matrix, a trans-reflective layer is disposed in the display panel, wherein the trans-reflective layer comprises reflection regions and transmission regions disposed alternately and corresponding to one group or a plurality groups of display units respectively. In this way, it is possible to enable both faces of the display device to display via the transmission regions, thereby realizing simultaneous display of both faces of the display device.

It is noted that each of the reflection regions of the trans-reflective layer and transmission regions of the trans-reflective layer corresponding to one group or a plurality groups of display units respectively means that a width of the reflection regions of the trans-reflective layer or the transmission regions of the trans-reflective layer is at least equal to a width of a group of display units 120. It is noted that the group number of display units 120 corresponding each reflection region of the trans-reflective layer and each transmission region of the trans-reflective layer is for example an integer, for example, the reflection region 1021 of the first trans-reflective layer 103 or the transmission regions 1022 of the first trans-reflective layer 103 corresponds to one, two or three groups of display units 120. The fewer the group number of display units 120 corresponding to the reflection region of the trans-reflective layer or the transmission region of the trans-reflective layer is, the higher the resolution of respective display device is, which is advantageous for improving display effect of the display device. In the embodiments of the present invention, description is given with respect to an example in which the reflection region of the trans-reflective layer and the transmission region of the trans-reflective layer correspond to one group of display units 120 respectively.

The reflection regions 1121 of the second trans-reflective layer 113 correspond to the transmission regions 1022 of the first trans-reflective layer 103; and the transmission regions 1122 of the second trans-reflective layer 113 correspond to the reflection regions 1021 of the first trans-reflective layer 103.

It is noted that the reflection regions 1121 of the second trans-reflective layer 113 corresponding to the transmission regions 1022 of the first trans-reflective layer 103 means that the reflection regions 1121 of the second trans-reflective layer 113 correspond to the transmission regions 1022 of the first trans-reflective layer 103 in terms of up and down positions, and a width of the reflection region 1121 of the second trans-reflective layer 113 is equal to that of at least one group of display units 120. As described above, the transmission regions 1122 of the second trans-reflective layer 113 corresponding to the reflection regions 1021 of the first trans-reflective layer 103 is in the same way.

With the opposed substrate 11 manufactured with such a structure, since the transmission regions 1021 and the reflection regions 1022 on the array substrate 10 and the opposed substrate 11 are in such a correspondence relationship as shown in FIG. 2, light reflected by the reflection regions 1021 of the first trans-reflective layer 103 on the array substrate 10 may be transmitted through the transmission regions 1122 of the second trans-reflective layer 113 on the opposed substrate 11 corresponding to the reflection regions 1021. At the same time, light transmitted through the transmission regions 1022 of the first trans-reflective layer 103 on the array substrate 10 may be reflected by the reflection regions 1121 of the second trans-reflective layer 113 on the opposed substrate 11 corresponding to the transmission regions 1022. In this way, it is possible to confine reflection or transmission range of light, avoid mutual interference among light, reduce picture ghost and hence improve display effect of the double-faced display.

Furthermore, the step of forming the pattern of the reflection regions (the reflection regions 1021 of the first trans-reflective layer 103 or the reflection regions 1121 of the second trans-reflective layer 113) or the transmission regions (the transmission regions 1022 of the first trans-reflective layer 103 or the transmission regions 1122 of the second trans-reflective layer 113) comprises:

S301. as shown in FIG. 5, forming a first control electrode 30 spaced away from each other on a surface of the transparent substrate (the first transparent substrate 101 or the second transparent substrate 110).

S302. Forming a second control electrode 31 on a surface of the first control electrode 30 which is spaced away from the first control electrode 30 by a gap.

S303. Injecting liquid crystal molecules between the first control electrode 30 and the second control electrode 31 to form a second liquid crystal layer 32, wherein the second liquid crystal layer comprises polymer dispersed liquid crystal.

Exemplarily, as shown in FIG. 5, such structure of the reflection region or the transmission region may be referred to as a PDLC (Polymer Dispersed Liquid Crystal) structure. The PDLC structure may have two operation modes, that is, a scattering state and a transparent state. When the first reflecting electrode 30 and the second reflecting electrode 31 are not energized, no regular electric field is formed in the second liquid crystal layer, optical axes of liquid crystal molecules are orientated randomly in a disordered state, incident light is strongly scattered, and the second liquid crystal layer exhibits an opaque or translucent state. When the first reflecting electrode 30 and the second reflecting electrode 31 are energized, the optical axes of the liquid crystal molecules are aligned to be perpendicular to a surface of the second liquid crystal layer, namely, in consistent with the electric field direction, hence constituting a uniform media, and the second liquid crystal layer exhibits transparent state.

It is noted that there are two manufacturing methods of the reflection regions or the transmission regions of the PDLC structure.

A First Method

S401. as shown in FIG. 5, forming the first control electrode 30 spaced away from each other by sputtering ITO on a surface of the transparent substrate (the first transparent substrate 101 or the second transparent substrate 110).

S402. Forming an electrode layer (the first electrode layer 102 or the second electrode layer 112) and forming the second control electrodes 31 spaced away from each other by sputtering ITO on a surface of the electrode layer; and cell-assembling the first control electrodes 30 and the second control electrodes 31.

S403. Injecting liquid crystal between the first control electrodes 30 and the second control electrodes 31 to form a second liquid crystal layer 32.

A Second Method

Figure 7:
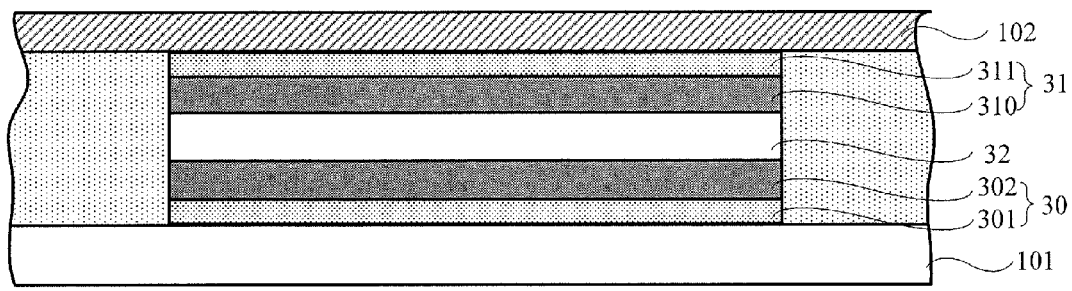
FIG. 7 is a structural schematic view showing a reflection region or a transmission region according to an embodiment of the present invention.
Figure 8:
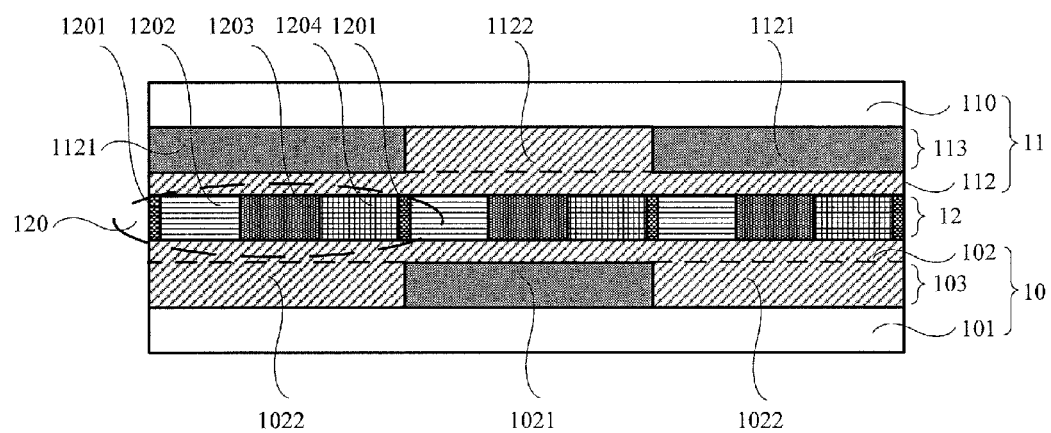
FIG. 8 is a structural schematic view of yet another double-faced display panel according to an embodiment of the present invention.

The description is given by taking an example of forming the reflection regions 1021 of the PDLC structure on the first transparent substrate 101:

S501. As shown in FIG. 7, attaching a first reflective substrate 301 on a surface of the first transparent substrate 101.

S502. Forming a first reflective electrode layer 302 by one patterning process on a surface of the first reflective substrate 301, for example, forming the first reflective electrode layer 302 by sputtering ITO (indium tin oxide) on the surface of the first reflective substrate 301 to form the first control electrodes 30.

S503. Attaching a second reflective substrate 311 on a side of the first electrode layer 102 close to the transparent substrate, forming a second reflective electrode layer 310 by one patterning process on a surface of the second reflective substrate 311, for example, forming the second reflective electrode layer 310 by sputtering ITO (indium tin oxide) on the surface of the second reflective substrate 311 to form a second reflective electrode layer 310, thereby forming the second control electrodes 31; disposing the first control electrodes 30 and the second control electrodes 31 to face each other and to have a gap between the first control electrodes 30 and the second control electrodes 31.

S504. Injecting liquid crystal between the first control electrodes 30 and the second control electrodes 31 to form a second liquid crystal layer 32.

Exemplarily, the step of forming the pattern of the reflection regions comprises:

forming reflective metal layers spaced away from each other by one patterning process on a surface of a transparent substrate (the first transparent substrate 101 or the second transparent substrate 110), wherein material for manufacturing the reflective metal layers comprises: at least one of aluminum, magnesium, nickel, copper or aluminum oxide or a mix of several of aluminum, magnesium, nickel, copper or aluminum oxide.

In embodiments of the present invention, the patterning process may be any known substrate production process that can implement patterning by the inventor, for example, the patterning process may comprise a sputtering process, an exposing process or a evaporation process. For example, as shown in FIG. 2, the reflective metal layers spaced away from each other are formed by sputtering on the surface of the first transparent substrate 101.

Furthermore, when the transmission regions of the trans-reflective layer (the first trans-reflective layer 103 or the second trans-reflective layer 113) are of transparent conducting material (such as, indium tin oxide, indium zinc oxide), the step of forming the pattern of the transmission regions comprises:

Forming the transmission regions (the transmission regions 1022 of the first trans-reflective layer 103 or the transmission regions 1122 of the second trans-reflective layer 113) adjacent to the reflection regions and electrode layers (the first electrode layer 102 or the second electrode layer 112) on surfaces of the transmission regions and the reflection regions respectively by sputtering transparent conducting material on a surface of the transparent substrate on which the pattern of the reflection regions (the reflection regions 1021 of the first trans-reflective layer 103 or the reflection regions 1121 of the second trans-reflective layer 113) is formed, wherein the transmission regions and the electrode layers are an integral structure.

By taking FIG. 2 as an example, a detail description will be given of the manufacturing method for the above-mentioned display panel.

S601. forming the reflection regions 1021 with a width of 150~300 μm spaced away from each other by sputtering and then patterning aluminum oxide with a thickness of 150 nm on a surface of the first transparent substrate 101.

S602. Forming a pattern of the transmission regions 1022 with a width of 150~300 μm and a thickness of 150 nm, adjacent to the reflection regions 1021 by coating transparent resin on a surface of the first transparent substrate 101 on which the pattern of the reflection regions 1021 is formed so as to form a first trans-reflective layer 103.

S603. Forming a first electrode layer 102 with a thickness of 150 nm by sputtering ITO on a surface of the first trans-reflective layer 103. An array substrate 10 is formed after this step is completed.

S604. Depositing light shielding resin material with a thickness of 10~15 μm on a surface of the first electrode layer 102 and etching it to form black barrier walls 1201 each with a width of 10~15 μm and an interval of 50~100 μm therebetween. Then filling red electrochromic material 1202, green electrochromic material 1203 and blue electrochromic material 1204 into gaps between the black barrier walls 1201 by injecting. Herein, a thickness of the red electrochromic material 1202, the green electrochromic material 1203 and the blue electrochromic material 1204 is 10~15 μm. The display structure 12 is formed after completing this step.

S605. Forming the reflection regions 1121 with a width of 150~300 μm spaced away from each other by sputtering and then patterning aluminum oxide with a thickness of 150 nm on a surface of the second transparent substrate 110. The reflection regions 1121 and the transmission regions 1022 of the first trans-reflective layer 103 correspond to each other up and down in terms of locations.

S606. Forming a pattern of the transmission regions 1122 with a width of 150~300 μm and a thickness of 150 nm, adjacent to the reflection regions 1121 by coating transparent resin on a surface of the second transparent substrate 110 on which the pattern of the reflection regions 1121 is formed so as to form a second trans-reflective layer 113.

S607. Forming a second electrode layer 112 with a thickness of 150 nm by sputtering ITO on a surface of the second trans-reflective layer 113 to form an opposed substrate 11 and then cell-assembling the array substrate 10 and the opposed substrate 11.

S608. Leveling a sealing end and then cleaning a product.

In the embodiments of the present invention, when the transmission regions of the first trans-reflective layer 103 and the first electrode layer 102 are formed as an integral structure and the transmission regions 1122 of the second trans-reflective layer 113 and the second electrode layer 112 are formed as an integral structure, taking FIG. 7 as an example, the manufacturing method for the above-mentioned display panel will be described in detail.

S701. forming the reflection regions 1021 with a width of 150~300 μm spaced away from each other by sputtering and then patterning aluminum oxide with a thickness of 150 nm on a surface of the first transparent substrate 101.

S702. sputtering ITO on a surface of the first transparent substrate 101 on which the pattern of the reflection regions 1021 is formed and forming the transmission regions with a thickness of 300 nm between the reflection regions 1021 as well as a first electrode layer 102 with a thickness of 150 nm on a surface of the first trans-reflective layer 103 so as to form an array substrate 10.

S703. depositing light shielding resin material with a thickness of 10~15 μm on a surface of the first electrode layer 102 and etching it to form black barrier walls 1201 each with a width of 10~15 μm and with an interval of 50~100 μm therebetween. Then filling red electrochromic material 1202, green electrochromic material 1203 and blue electrochromic material 1204 into gaps between the black barrier walls 1201 by injecting. Herein, a thickness of the red electrochromic material 1202, the green electrochromic material 1203 and the blue electrochromic material 1204 is 10~15 μm.

S704. forming the reflection regions 1121 with a width of 150~300 μm spaced away from each other by sputtering and then patterning aluminum oxide with a thickness of 150 nm on a surface of the second transparent substrate 110. The reflection regions 1121 and the transmission regions 1022 of the first trans-reflective layer 103 correspond to each other up and down in terms of locations.

S705. sputtering ITO on a surface of the second transparent substrate 110 on which the pattern of the reflection regions 1121 is formed and forming the transmission regions with a thickness of 300 nm between the reflection regions 1021 as well as a second electrode layer 112 with a thickness of 150 nm on a surface of the second trans-reflective layer 113 so as to form an opposed substrate 11, and then cell-assembling the array substrate 10 and the opposed substrate 11.

S706. Leveling the sealing end and cleaning.

Figure 9:
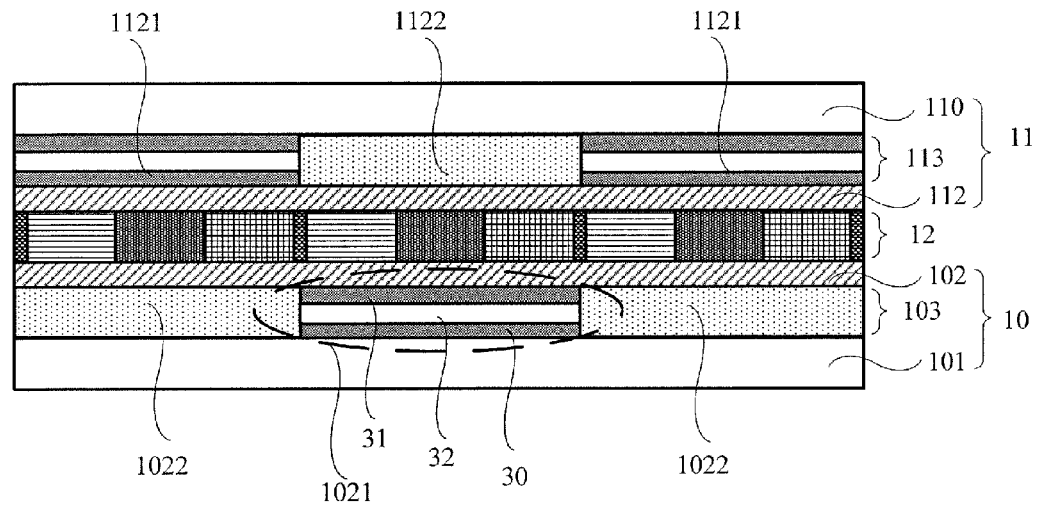
FIG. 9 is a structural schematic view of yet another double-faced display panel according to an embodiment of the present invention.
Figure 10:
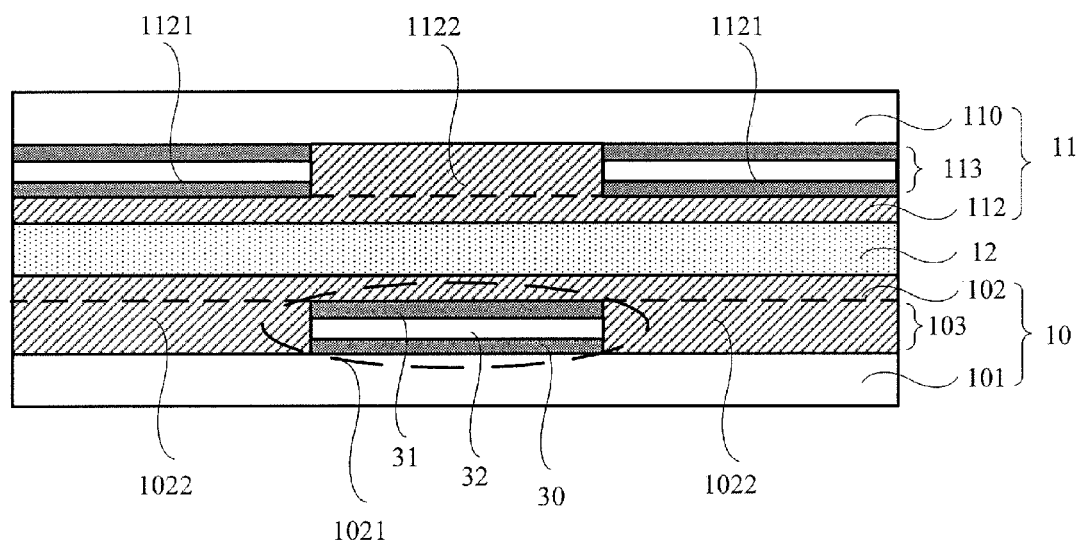
FIG. 10 is a structural schematic view of yet another double-faced display panel according to an embodiment of the present invention.

In the embodiments of the present invention, when the reflection regions 1021 is of the PDLC structure and the transmission regions 1022 is of insulating transparent material, a obtained structure is as shown in FIG. 9. When the reflection regions 1021 are of the PDLC structure and the transmission regions 1022 and the electrode layer (the first electrode layer 102 or the second electrode layer 112) are an integral structure, a obtained structure is as shown in FIG. 10. Of course, the above structures designed with the display panel provided in the embodiments of the present invention are only for illustration, other structure designs with the display panel provided in embodiments of the present invention will not be listed here, but should be included within the protection scope of the present invention. A manufacturing method of the display panel according to the embodiments of the present invention may be referred to an exemplary manufacturing method provided in the embodiments of the present invention, which will not be described here.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A double-faced display panel, comprising:
   an array substrate, comprising:
   a first transparent substrate;
   a first trans-reflective layer, formed on the first transparent substrate; and
   a first electrode layer, formed on the first trans-reflective layer and the first electrode layer being a single continuous layer;
   an opposed substrate, disposed to face the array substrate, and comprising:
   a second transparent substrate;
   a second trans-reflective layer, formed on a side of the second transparent substrate facing the first transparent substrate; and
   a second electrode layer, formed on a side of the second trans-reflective layer facing the first transparent substrate and the second electrode layer being a single continuous layer;
   a display structure, disposed between the array substrate and the opposed substrate and comprising a plurality groups of display units arranged in matrix,
   wherein each of the first and second trans-reflective layers comprises a plurality of reflection regions and a plurality of transmission regions disposed alternately.

2. The double-faced display panel of claim 1, wherein the reflection regions of the first trans-reflective layer and the transmission regions of the second trans-reflective layer are in a one to one correspondence relationship, and the transmission regions of the first trans-reflective layer and the reflection regions of the second trans-reflective layer are in a one to one correspondence relationship.

3. The double-faced display panel of claim 2, wherein each of the reflection regions of the first trans-reflective layer and each of the transmission regions of the second trans-reflective layer correspond to one or more groups of the display units, and each of the transmission regions of the first trans-reflective layer and each of the reflection regions of the second trans-reflective layer correspond to one or more groups of the display units.

4. The double-faced display panel of claim 3, wherein each group of the display units comprises a red display unit, a green display unit and a blue display unit disposed adjacent to each other.

5. The double-faced display panel of claim 3, wherein one or more groups of display units corresponding to each transmitting region or each reflection region and one or more groups of display units corresponding to each adjacent reflective region or each adjacent transmission region are input different image signals.

6. The double-faced display panel of claim 1, wherein the display structure comprises an electroluminescent layer.

7. The double-faced display panel of claim 1, wherein the display structure comprises an electrochromic layer.

8. The double-faced display panel of claim 1, wherein the double-faced display panel is formed as a liquid crystal double-faced display panel, the display structure comprises a first liquid crystal layer and the liquid crystal double-faced display panel further comprises:
   a first polarizing film layer, disposed on a side of the array substrate opposite to the opposed substrate;
   a second polarizing film layer, disposed on a side of the opposed substrate opposite to the array substrate; and
   a color filter layer, disposed between the opposed substrate and the display structure or between the array substrate and the display structure.

9. The double-faced display panel of claim 1, wherein each of the reflection regions and/or each of the transmission regions comprises:
   a first control electrode, located on the first transparent substrate or the second transparent substrate;
   a second control electrode; and
   a second liquid crystal layer, located between the first control electrode and the second control electrode,
   wherein the second liquid crystal layer comprises polymer dispersed liquid crystal.

10. The double-faced display panel of claim 1, wherein each of the reflection regions comprises a reflective metal layer.

11. The double-faced display panel of claim 10, wherein materials for manufacturing the reflective metal layer comprise one or a combination of more of aluminum, magnesium, nickel, copper or aluminum oxide.

12. The double-faced display panel of claim 1, wherein in a condition that the transmission regions of the first and second trans-reflective layers are formed of transparent conducting material, each of the transmission regions and the first or second electrode layer adjacent thereto are formed as an integral structure.

13. The double-faced display panel of claim 1, wherein each of the reflection regions and/or each of the transmission regions have/has a thickness of 50~200 nm.

14. A manufacturing method of a double-faced display panel comprising an array substrate, an opposed substrate and a display structure disposed between the array substrate and the opposed substrate and having a plurality groups of display units arranged in matrix,
   wherein a step for manufacturing the array substrate comprises:
   forming a pattern of reflection regions spaced away from each other on a surface of a first transparent substrate;
   forming a pattern of transmission regions adjacent to the reflection regions on the surface of the first transparent substrate on which the pattern of the reflection regions is formed so as to form a first trans-reflective layer;
   forming a first electrode layer on a surface of the first trans-reflective layer and the first electrode layer being a single continuous layer;
   a step for manufacturing the opposed substrate comprises:
   forming a pattern of reflection regions spaced away from each other on a surface of a second transparent substrate;
   forming a pattern of transmission regions adjacent to the reflection regions on the surface of the second transparent substrate on which the pattern of the reflection regions is formed so as to form a second trans-reflective layer;
   forming a second electrode layer on a surface of the second trans-reflective layer and the second electrode layer being a single continuous layer.

15. The manufacturing method of a double-faced display panel of claim 14, wherein each of the reflection regions of the first trans-reflective layer and each of the transmission regions of the second trans-reflective layer correspond to one or more groups of the display units, and each of the transmission regions of the first trans-reflective layer and each of the reflection regions of the second trans-reflective layer correspond to one or more groups of the display units.

16. The manufacturing method of a double-faced display panel of claim 14, wherein the reflection regions of the first trans-reflective layer and the transmission regions of the second trans-reflective layer are in a one to one correspondence relationship, and the transmission regions of the first trans-reflective layer and the reflection regions of the second trans-reflective layer are in a one to one correspondence relationship.

17. The manufacturing method of a double-faced display panel of claim 14, wherein a step of forming the pattern of the reflection regions or the pattern of the transmission regions comprises:
   forming first control electrodes spaced away from each other on a surface of the first or second transparent substrate;
   forming second control electrodes on a surface of the first control electrode with gaps between the second control electrodes and the first control electrodes; and
   injecting liquid crystal molecules between the first control electrodes and the second control electrodes to form a second liquid crystal layer, wherein the second liquid crystal layer comprises polymer dispersed liquid crystal.

18. The manufacturing method of a double-faced display panel of claim 14, wherein a step of forming the pattern of the reflection regions comprises:
   forming reflective metal layers spaced away from each other by one patterning process on a surface of the first or second transparent substrate, materials for manufacturing the reflective metal layer comprising one or mixture of more of aluminum, magnesium, nickel, copper or aluminum oxide.

19. The manufacturing method of a double-faced display panel of claim 14, wherein in a condition that each of the transmission regions of the first or second trans-reflective layer is formed of transparent conducting material, the step for forming the pattern of the transmission regions comprises:
   forming the transmission regions adjacent to the reflection regions and the first or second electrode layer on surfaces of the transmission regions and the reflection regions respectively by sputtering the transparent conducting material on a surface of the first or second transparent substrate on which the pattern of the reflection regions is formed, the transmission regions and the adjacent first or second electrode layer being an integral structure.

20. The manufacturing method of a double-faced display panel of claim 14, wherein the step of forming the display structure comprises:
   forming an electroluminescent layer or an electrochromic layer on the array substrate or the opposed substrate; or
   cell-assembling the array substrate and the opposed substrate and injecting liquid crystal therebetween.

* * * * *